Patented June 13, 1950

2,511,467

UNITED STATES PATENT OFFICE 2,511,467

ESTER HYDROLYSIS

William F. Gresham, Wilmington, Del., assignor to E. I. du Pont de Nemours & Company, Wilmington, Del., a corporation of Delaware No Drawing. Application July 1, 1948,
Serial No. 36,451

5 Claims. (Cl. 260—541)

This invention relates to a process for the preparation of acids, and more particularly to the preparation of acetic acid by the hydrolysis of an alkyl acetate.

The process of converting an organic acid ester into an alcohol and an acid salt, and particularly the conversion of fats into soap by means of alkalis, is well-known, as well as the hydrolysis of glycerol-esters to free alcohols and ester salts. The former processes are generally characterized as involving saponification, although they are sometimes referred to as involving hydrolysis. The process of this invention relates to the conversion of aliphatic alcohol esters of organic acids to their corresponding acids with the incidental production of alcohols.

An object of the present invention is to provide an improved vapor phase process for converting aliphatic alcohol esters of organic acids to their corresponding acids. Another object is to provide suitable catalysts for such processes. A further object is to provide a process for the hydrolysis of aliphatic alcohol esters of organic acids to corresponding organic acids and alcohols wherein the hydrolysis is conducted by passing the vaporized ester over a hydrolysis catalyst. Yet, another object is to provide inorganic salts of organic acids as catalysts for the aforesaid reactions. Other objects and advantages of the invention will hereinafter appear.

According to the invention, an aliphatic alcohol ester of an organic acid is vaporized and passed with steam over a metal salt of an acid corresponding to the acid portion of the ester, the metal salt acting as a catalyst for the reaction. The unconverted ester, if any, is separated by fractional distillation from the product gases and returned to the conversion zone, the alcohol and acid being subjected to distillation or other suitable process for the recovery of the acid product.

The hydrolysis catalysts which are used in this reaction include the cadmium, silver and more particularly zinc salts of an organic acid corresponding to the acid portion of the ester being hydrolyzed. Such catalysts are prepared by digesting, by soaking or by other means, impregnating a suitable support such as activated carbon, activated silica, kieselguhr, or the like with a solution of the salt until the support has been thoroughly impregnated to give, based on the weight of support, from 1% to 30% of the anhydrous salt. The thus impregnated support is separated from the solution and air-dried. If desired, the impregnated support may be more thoroughly dried in a stream of nitrogen at a temperature in the order of 200° to 300° C. Such impregnated supports may be crushed, pilled, pelleted or otherwise formed in the most suitable shape for charging into the reaction zone. An excellent form of catalyst consists of 8 to 14 mesh activated charcoal mixed with ½ its volume of 8 to 14 mesh quartz, this composite support containing 2% to 15%, by weight of zinc acetate.

The hydrolysis of the ester is conducted by vaporizing the ester and then passing the vapor with water vapor over the aforesaid catalyst at a temperature between 200° and 400° C., and preferably between 230° and 300° C. The ester is passed into the reaction zone, preferably with an equimolar mixture of water, although the molar ratio may vary from 5:1 to 1:5 or more. It is to be understood, however, that the more water used over stoichiometric requirements, the more water must be separated from the product, and if less than stoichiometric amounts of water are employed, conversion of the ester suffers.

The reaction, if desired, may be conducted under normal or superatmospheric pressures ranging from 40 to 1000 lbs./sq. in. or more. For the conversion of methyl acetate to acetic acid pressures ranging between 200 and 500 lbs./sq. in. with temperatures ranging between 140° and 235° C. may be used. Temperatures at atmospheric pressure may range between 250° to 400° C., with a preferred temperature at about 300° C., and space velocities, in unit volumes per minute, between 50 and 500 and preferably between 100 and 300.

The process may be used for the preparation of acids from esters, volatile without decomposition, such, for example, as the methyl, ethyl, normal and isopropyl, normal and isobutyl, amyl, hexyl, octyl, nonyl, dodecyl and higher straight and branch chain alcohol esters of formic, acetic, propionic, butyric, valeric, and the higher straight and branch chain aliphatic organic acids, as well as acrylic, oxalic, adipic, and higher mono and polybasic aliphatic organic acids.

The examples here given illustrate embodiments of the invention in which parts are by weight unless otherwise stated:

*Example 1.*—A reaction zone was charged with a catalyst prepared by soaking 300 parts of 8–14 mesh silica gel in a mixture of 280 parts of water and 120 parts of zinc acetate-dihydrate solution, the resulting mixture being allowed to stand at 95° C. for about 1 hour, the unabsorbed liquid being drained off while hot and the impregnated silica gel air-dried at 120° C. An equimolar mixture of water and methyl acetate containing 4 weight percent of methanol, the alcohol being present to give a single phase liquid, was vaporized and passed over the aforesaid catalyst at a temperature between 230 and 300° C. with a contact time of about 12 seconds. The conversion of water and ester to acetic acid and methanol was 49.2%. The yield was substantially quantitative.

Example 2.—A reaction was conducted in accord with the process of Example 1 using charcoal, impregnated with about 10 parts zinc acetate as the catalyst, over which was passed a vapor containing 74 parts of methyl acetate, 18 parts of water and 4.2 parts of methanol at a rate of 10.9 parts of ester per hour. Nitrogen at the rate of 0.1 cu. ft./hr. was also passed over the catalyst with the aforesaid vapors to maintain the flow. The reaction was conducted at a temperature between 298° and 303° C. The conversion of water and ester to acetic acid and methanol was about 49.2%.

Example 3.—A reaction was conducted in accord with the process of Example 1 using a zinc acetate impregnated charcoal catalyst, similar to that of Example 2, over which was passed a vapor containing 84 parts of methyl acetate and 9 parts of water at a rate of 11 parts of ester per hour and a nitrogen rate of 0.64 cu. ft./hr., the hydrolysis being conducted at a temperature between 217 and 228° C. The conversion of water and ester to acetic acid was about 9%. By increasing the ester to water ratio from 1:1 to 3:1 the conversion was increased to 17.9% to 7.6% respectively for water and ester to acetic acid.

Example 4.—The process of Example 1 was repeated using a catalyst of cadmium acetate deposited on silica gel (prepared by soaking for ½ hour 200 cc. of silica gel with 200 grams of cadmium acetate in 100 grams of water followed by draining and drying) with a vapor of 73.65 parts of methyl acetate and 6.35 parts of water fed at a rate of 13.8 parts of ester per hour, together with hydrogen fed at a rate of 0.064 cu. ft./hr. The reaction was carred out at a temperature between 275° and 285° C. The conversion of water and ester to acetic acid was 23.7% and 7.9% respectively.

The processes described in the examples can be duplicated for the hydrolysis of esters other than those illustrated, it being merely necessary to vaporize the ester and in a manner similar to that of the examples conduct the ester vapors, with steam, over the catalyst.

I claim:

1. In a process of converting a volatile aliphatic alcohol ester of an organic acid to its corresponding acid and alcohol, the step which comprises passing the ester and water in the vapor phase over a zinc salt of an organic acid corresponding to the organic acid being hydrolyzed at a temperature between 250° and 400° C.

2. The process of claim 1 in which the catalyst is disposed on an activated support.

3. In a process for converting an alkyl acetate to acetic acid and an alcohol, the step which comprises passing an alkyl acetate and water in the vapor phase over a zinc acetate catalyst at a temperature between 250° and 400° C.

4. In a process of converting methyl acetate to acetic acid and methanol, the step which comprises passing a mixture of methyl acetate and water in the vapor phase over a zinc acetate catalyst supported on activated charcoal at a temperature between 250° and 400° C.

5. In a process of converting methyl acetate to acetic acid and methanol, the step which comprises passing a mixture of methyl acetate, water and methanol at a temperature of about 300° C. over a zinc acetate catalyst supported on activated charcoal.

WILLIAM F. GRESHAM.

REFERENCES CITED

The following references are of record in the file of this patent:

UNITED STATES PATENTS

| Number | Name | Date |
|---|---|---|
| 1,647,676 | Von Retze | Nov. 1, 1927 |
| 1,697,109 | Drefus | Jan. 1, 1929 |
| 2,304,872 | Bachman et al. | Dec. 15, 1942 |

OTHER REFERENCES

Karrer, "Org. Chemistry" (Elsevier, 1938), p. 192.